US012701008B2

(12) United States Patent
Manuel-Devadoss

(10) Patent No.: US 12,701,008 B2
(45) Date of Patent: Aug. 4, 2026

(54) PRIVACY ENGINE(S) FOR MASKING CONFIDENTIAL INFORMATION DURING VERIFICATION PROCESSES WITHIN DISTRIBUTED SYSTEMS

(71) Applicant: Oracle International Corporation, Redwood City, CA (US)

(72) Inventor: Johnson Manuel-Devadoss, Elkridge, MD (US)

(73) Assignee: Oracle International Corporation, Redwood City, CA (US)

( * ) Notice: Subject to any disclaimer, the term of this patent is extended or adjusted under 35 U.S.C. 154(b) by 64 days.

(21) Appl. No.: 18/975,521

(22) Filed: Dec. 10, 2024

(65) Prior Publication Data

US 2026/0163737 A1     Jun. 11, 2026

(51) Int. Cl.
H04L 9/32        (2006.01)
H04L 9/08        (2006.01)

(52) U.S. Cl.
CPC .......... H04L 9/3218 (2013.01); H04L 9/0869 (2013.01)

(58) Field of Classification Search
CPC ..................................................... H04L 9/3218
See application file for complete search history.

(56) References Cited

U.S. PATENT DOCUMENTS

| | | | | |
|---|---|---|---|---|
| 9,979,549 | B2 * | 5/2018 | Hiwatari .................. | H04L 9/14 |
| 11,405,189 | B1 * | 8/2022 | Bennison ................ | H04L 9/083 |
| 11,424,939 | B1 * | 8/2022 | Allen .................... | H04L 9/3234 |
| 12,401,513 | B2 * | 8/2025 | Ragnoli ................ | H04L 9/3066 |
| 12,580,740 | B2 * | 3/2026 | Venkatesan ........... | H04L 9/0825 |
| 2002/0103999 | A1 * | 8/2002 | Camnisch ............. | H04L 9/3263 |
| | | | | 713/155 |
| 2006/0117181 | A1 * | 6/2006 | Brickell ................ | H04L 9/3271 |
| | | | | 713/176 |
| 2014/0093077 | A1 * | 4/2014 | Jawurek ................ | H04L 63/123 |
| | | | | 380/268 |
| 2014/0281525 | A1 * | 9/2014 | Acar ..................... | H04L 9/3226 |
| | | | | 713/168 |
| 2020/0127834 | A1 * | 4/2020 | Westland .............. | H04L 9/3221 |
| 2020/0396075 | A1 * | 12/2020 | Visegrady ............. | H04L 9/3234 |
| 2021/0160223 | A1 * | 5/2021 | Hwang .................... | H04L 9/30 |
| 2022/0109573 | A1 * | 4/2022 | Ceravolo .............. | H04L 9/3221 |

(Continued)

*Primary Examiner* — Khang Do

(57)        ABSTRACT

Various embodiments of the present technology generally relate to systems and methods for providing a privacy engine. In an example, the privacy engine converts, on a prover-side, confidential information into a plurality of tuples for a verification process and embeds the plurality of tuples with an embedding element. The prover-side privacy engine then generates a commitment using the tuples and transmits the commitment to a verifier-side privacy engine. Responsive to receiving the commitment, the verifier-side privacy engine verifies that the commitment includes the embedded element and generates a challenge to the commitment based on the commitment containing the embedded element. The verifier-side privacy engine then transmits the challenge to the prover-side privacy engine, which responsively generates a response containing the embedded element based on the challenge. Based on the response, the verifier-side privacy engine validates the response from the prover-side privacy engine based on the response containing the embedded element.

20 Claims, 5 Drawing Sheets

(56) References Cited

U.S. PATENT DOCUMENTS

| | | | |
|---|---|---|---|
| 2022/0329432 A1* | 10/2022 | Kawaguchi | H04L 9/3247 |
| 2023/0401226 A1* | 12/2023 | Garoffolo | H04L 9/50 |
| 2023/0403161 A1* | 12/2023 | El Khiyaoui | H04L 9/50 |
| 2024/0078541 A1* | 3/2024 | Trevethan | G06Q 20/3829 |
| 2024/0121081 A1* | 4/2024 | Venkatesan | H04L 9/0825 |
| 2024/0135380 A1* | 4/2024 | Azgad-Tromer | G06Q 20/383 |
| 2024/0388436 A1* | 11/2024 | Solow | H04L 9/3218 |
| 2024/0411831 A1* | 12/2024 | Mishra | G06F 17/11 |
| 2024/0411869 A1* | 12/2024 | Patel | G06Q 30/0185 |
| 2024/0411900 A1* | 12/2024 | Xu | H04L 9/088 |
| 2025/0125964 A1* | 4/2025 | Pourtabatabaie | H04L 9/0872 |
| 2025/0219830 A1* | 7/2025 | Gan | H04L 9/3218 |
| 2025/0307436 A1* | 10/2025 | Doyle | G06F 21/606 |
| 2026/0019265 A1* | 1/2026 | Poh | H04L 9/3221 |

* cited by examiner

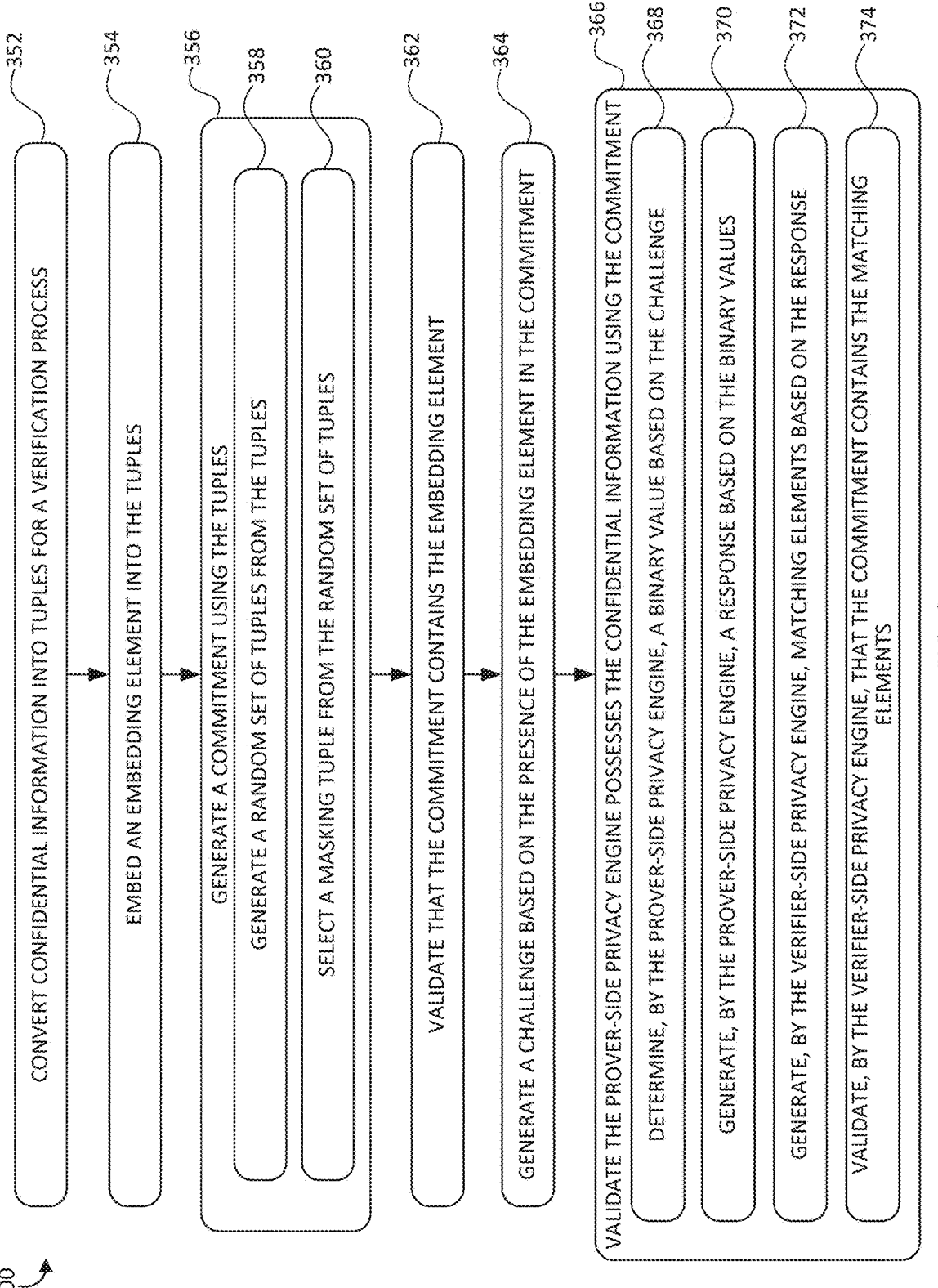

300

352   CONVERT CONFIDENTIAL INFORMATION INTO TUPLES FOR A VERIFICATION PROCESS

354   EMBED AN EMBEDDING ELEMENT INTO THE TUPLES

356   GENERATE A COMMITMENT USING THE TUPLES

358   GENERATE A RANDOM SET OF TUPLES FROM THE TUPLES

360   SELECT A MASKING TUPLE FROM THE RANDOM SET OF TUPLES

362   VALIDATE THAT THE COMMITMENT CONTAINS THE EMBEDDING ELEMENT

364   GENERATE A CHALLENGE BASED ON THE PRESENCE OF THE EMBEDDING ELEMENT IN THE COMMITMENT

366   VALIDATE THE PROVER-SIDE PRIVACY ENGINE POSSESSES THE CONFIDENTIAL INFORMATION USING THE COMMITMENT

368   DETERMINE, BY THE PROVER-SIDE PRIVACY ENGINE, A BINARY VALUE BASED ON THE CHALLENGE

370   GENERATE, BY THE PROVER-SIDE PRIVACY ENGINE, A RESPONSE BASED ON THE BINARY VALUES

372   GENERATE, BY THE VERIFIER-SIDE PRIVACY ENGINE, MATCHING ELEMENTS BASED ON THE RESPONSE

374   VALIDATE, BY THE VERIFIER-SIDE PRIVACY ENGINE, THAT THE COMMITMENT CONTAINS THE MATCHING ELEMENTS

FIG. 3

Figure 5:
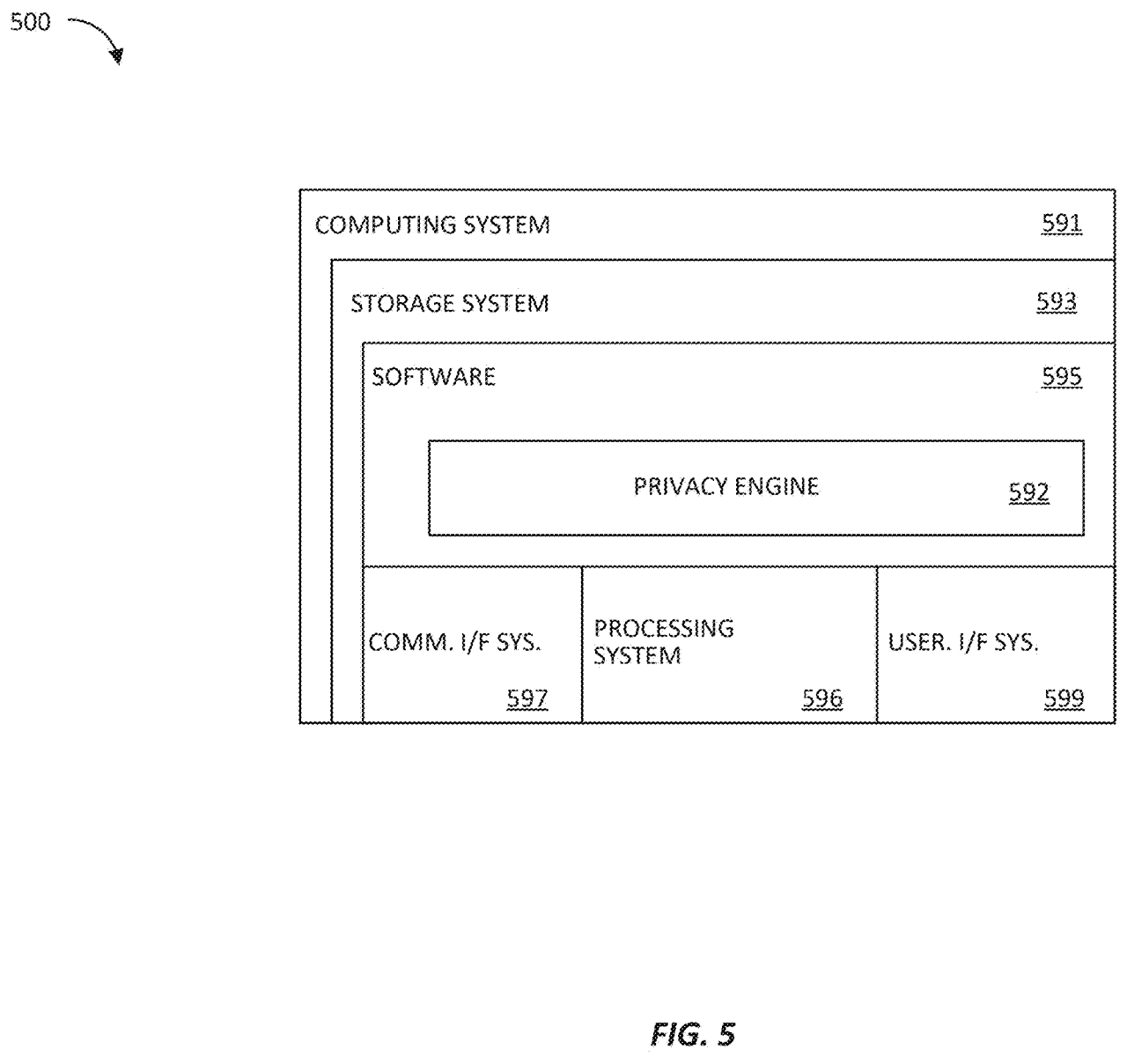

COMPUTING SYSTEM 591

STORAGE SYSTEM 593

SOFTWARE 595

PRIVACY ENGINE 592

COMM. I/F SYS. 597

PROCESSING SYSTEM 596

USER. I/F SYS. 599

PRIVACY ENGINE(S) FOR MASKING CONFIDENTIAL INFORMATION DURING VERIFICATION PROCESSES WITHIN DISTRIBUTED SYSTEMS

TECHNICAL FIELD

Various embodiments of the present technology generally relate to network function communication within networks. More specifically, embodiments of the present technology relate to systems and methods for providing a privacy engine for managing masking confidential information during identification processes within distributed systems.

BACKGROUND

In the advent of the digital age, privacy and confidentiality have become increasingly poignant, as personal data is now more accessible and vulnerable than ever before. From social media platforms to online transactions, the sheer volume of sensitive information circulating in cyberspace has heightened concerns over data breaches, misuse, and surveillance. As individuals demand greater control over their personal information, the tension between ensuring privacy and implementing robust identity verification systems has grown. Identity verification, a critical component of secure digital interactions, often requires sharing sensitive data that could potentially compromise privacy. This juxtaposition of maintaining user anonymity while confirming their identity presents a complex challenge that current verification and identification systems and techniques struggle to address.

Accordingly, there exists a need for systems and techniques for improved verification processes that retain the privacy of confidential information while allowing validation of a respective user. In particular, there is a need for a privacy engine and its related functions as provided herein.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a privacy engine and one or more of its related functions. As described in greater detail below, the privacy engine provides an enhanced ZKP process for verifying a prover's confidential information without exposing the private data. In an aspect, a privacy engine on the prover-side converts the confidential information into tuples for the verification process. Once in tuples, the privacy engine embeds an embedding element, such as a watermark into the tuples. Then, the privacy engine generates a commitment using the tuples. In some embodiments, generating a commitment includes generating a random set of tuples using a Cryptographically Secure Pseudorandom Number Generator (CSRING) and selecting a random masking tuple from the random set of tuples.

Once the commitment is generated, the privacy engine submits the commitment to a verifier-side. The verifier-side may include a complementary privacy engine which generates a random challenge responsive to the commitment. Based on the challenge, the prover-side privacy engine generates a response. The response is generated to include at least a subset of the random set of tuples and/or masking tuple determined based on the challenge. Once generated, the response is transmitted by the privacy engine to the verifier-side privacy engine, which in turn validates the response against the commitment. If the response is verified against the commitment, then the privacy engine validates that the prover possesses the confidential information and the verification process is completed.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 3 provides an example privacy engine process, according to an embodiment herein;

FIG. 5 shows an example computing device suitable for providing a privacy engine and its related functions, according to an embodiment herein.

Figure 1:
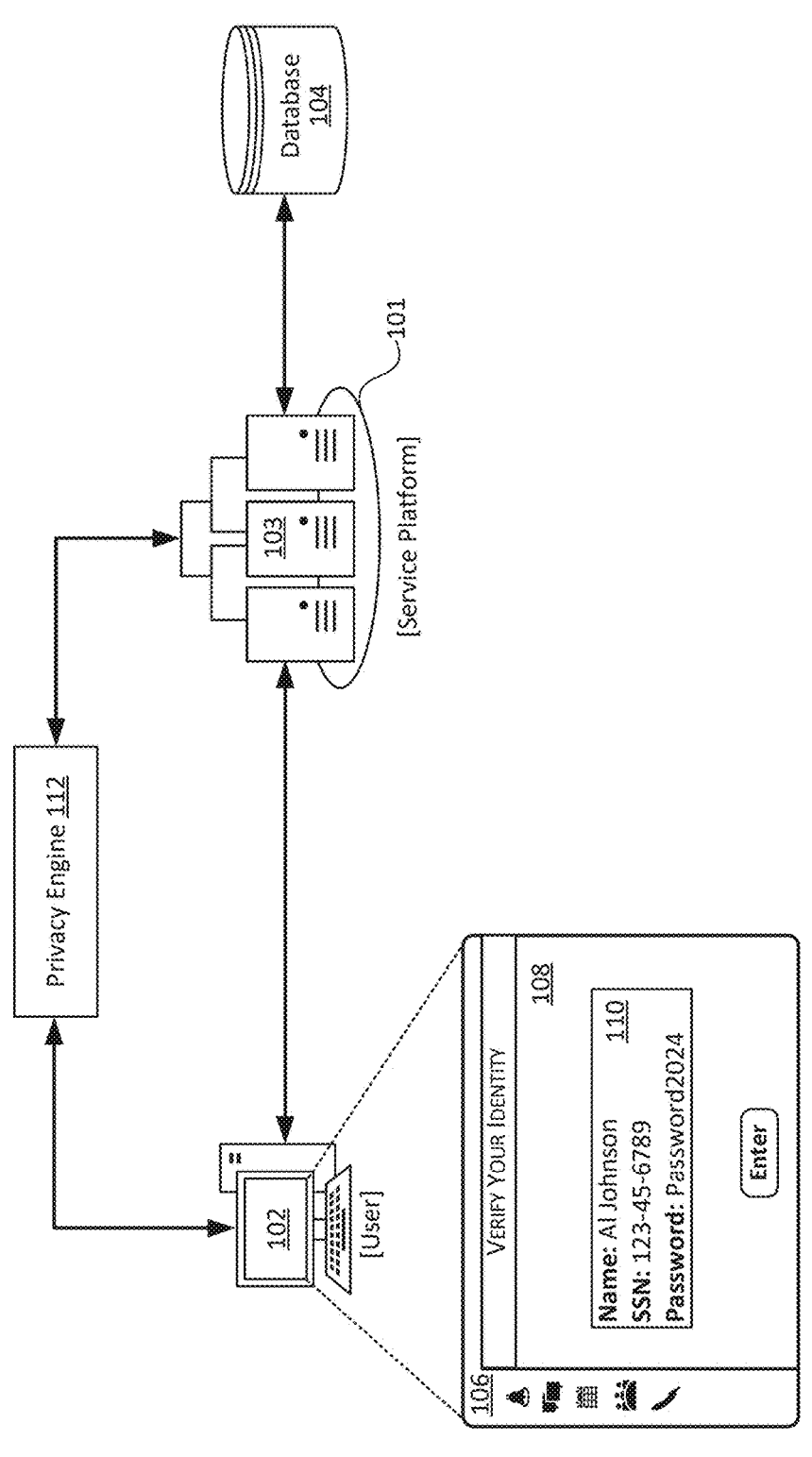
FIG. 1 illustrates an example operational environment in which a privacy engine is implemented to provide an enhanced verification process within a distributed system, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Identity verification and authentication are critical components in the design and operation of distributed systems, ensuring secure and reliable interactions between users, devices, and services. In such systems, identity verification establishes the legitimacy of an entity's claimed identity, often through mechanisms like biometrics, government-issued identification, or digital certificates. Authentication, on the other hand, validates the authenticity of the entity's credentials through techniques such as passwords, multi-factor authentication (MFA), or cryptographic protocols. These processes are fundamental to maintaining trust in distributed environments, where participants are often geographically dispersed and rely on secure communication and data sharing. By employing robust verification and authentication methods, distributed systems mitigate risks such as unauthorized access, fraud, and data breaches, fostering a secure ecosystem for decentralized operations.

One approach to verification and authentication processes within distributed systems involves zero-knowledge proofs (ZKPs). A ZKP is a cryptographic method that allows one party, known as the prover, to demonstrate to another party, the verifier, that a specific statement is true—without revealing any additional information beyond the validity of the statement. For instance, a user can prove they possess the credentials necessary to access a system or meet a requirement (e.g., being of a certain age) without disclosing sensitive details like passwords or birthdates. This is achieved through algorithms that satisfy three key properties: completeness (valid statements can always convince the verifier), soundness (false statements cannot fool the verifier), and zero-knowledge (no extraneous information is revealed). By integrating ZKPs, distributed systems can strengthen security while preserving privacy, enabling trusted interactions without compromising sensitive data.

While zero-knowledge proofs (ZKPs) offer significant advantages in enhancing security and privacy, they are not without limitations. A primary concern is ensuring their resilience against the ever-advancing nature of cyber-attacks. Emerging technologies, such as quantum computing, pose a potential threat to existing cryptographic algorithms, including those underpinning ZKPs. Additionally, as cyber threats evolve, attackers may seek to exploit weaknesses in implementation or identify novel ways to bypass proof systems. These risks highlight the need for continuous improvement and innovation in verification and authentication processes. It is essential to develop more robust cryptographic methods that not only uphold the privacy guarantees of ZKPs but also ensure their long-term security and adaptability in the face of increasingly sophisticated cyber threats.

Providing robust zero-knowledge proofs (ZKPs) to protect against ever-advancing cyber threats is especially critical when ZKPs are utilized within distributed systems. The inherently decentralized and interconnected nature of these environments amplifies the risks posed by cyber threats. Unlike traditional centralized systems, distributed systems often involve multiple independent entities—users, devices, and services—operating across diverse and often untrusted networks. This increased attack surface makes traditional verification and authentication methods more susceptible to breaches, interception, and exploitation. ZKPs help address these challenges by enabling secure and privacy-preserving interactions, but their robustness is essential. Any vulnerability in a ZKP system could jeopardize the security of the entire distributed network, exposing sensitive data and critical resources. Furthermore, distributed systems frequently support essential services, such as blockchain platforms, cloud infrastructures, and IoT networks, where a single security breach could have widespread and catastrophic consequences. To maintain trust and ensure the integrity of these ecosystems, ZKPs must be resilient against evolving threats while remaining adaptable to diverse and complex applications.

To provide enhanced verification processes for identification and authentication processes within distributed systems, an example privacy engine and its related functions are provided herein. Specifically, the privacy engine provides an enhanced Zero-Knowledge Proof process with heightened security and privacy steps to verify a prover without disclosing confidential information. As will be described in greater detail below, the privacy engine generates a plurality of tuples from the confidential information. Then, an embedding element, such as a watermark is embedded into the tuples. A random set of tuples are then generated using a Secure Random Number Generator, such as CSPRNG, from the tuples. In some embodiments, a masking tuple is selected from the random set of tuples to increase the randomness and security of the verification process. A commitment is then generated based on the random set of tuples and, in some cases, the masking tuple. The commitment is then provided to a verifier-side privacy engine that validates the prover based on the commitment.

By adding the embedded element, along with generating a random set of tuples using a randomly seeded CSPRNG, the privacy engine provides an enhanced ZKP protocol over current techniques. In particular, the privacy engine obscures the confidential information further than conventional techniques, while still allowing the prover to verify its possession of the confidential information. By further obscuring the confidential information, the privacy engine provides enhanced user privacy and reduces the attack surface within a distributed system by preventing interception or reply attacks. The enhancements provided by the privacy engine strengthen the knowledge exchange within ZKP frameworks, ensuring that even in a comprised or untrusted network environment, the integrity of the interaction remains intact. Ultimately, the privacy engine provides a secure, privacy-preserving framework that is particularly well-suited for the decentralized and untrusted nature of distributed systems, fostering greater confidence among users and entities interacting within such ecosystems Turning now to the Figures, FIG. 1 illustrates an example operational environment 100 in which a privacy engine 112 may be implemented to provide an enhanced verification process within a distributed system, according to an embodiment herein. As illustrated, the operational environment 100 may be a distributed environment including a service platform 101 which delivers various services to the client device 102. For example, the service platform 101 may act as a centralized hub within a distributed system, orchestrating the delivery of resources, processing capabilities, and service functionalities to the client device 102. It should be appreciated that any number of client devices 102 may interact with the service platform 101, however, a limited number is illustrated for ease of explanation. Examples of the client device 102 may include personal computers, tablet computers, mobile phones, gaming consoles, wearable devices, Internet of Things (IoT) devices, and any other suitable devices, of which computing apparatus 591 in FIG. 5 is also broadly representative.

As illustrated, the service platform 101 serves as a centralized framework that delivers a variety of functions and features to the client device 102. Specifically, the service platform 101 provides software service capabilities to endpoints like the client device 102, enabling seamless digital interactions through tools such as communication applications for email, messaging, posts, and blogs. The client device 102 interfaces with the service platform 101 by executing software applications—these can be natively installed applications, web-based applications running in a browser, mobile apps, streaming apps, or other suitable application types.

Additionally, the service platform 101 provides functionalities that enable the client device 102 to securely access and interact with a database 104. This includes retrieving, modifying, or storing files and data within the database 104, facilitated by the platform's integrated services for database management and file handling. The platform ensures efficient and secure access to these resources through features such as front-end and application servers, content storage, and robust security mechanisms like authentication and authorization services, enabling seamless integration across the distributed system.

To interact with the service platform 101, the client device 102 may communicate with the service platform 101 via one or more internets and intranets, the Internet, wired and wireless networks, local area networks (LANs), wide area networks (WANs), or any other type of network or combination thereof. In the illustrated example, the service platform 101 operates in a cloud-based environment. As such, the service platform 101 employs one or more server computers 103 co-located with respect to each other or distributed across one or more data centers to deliver its functionalities and services. Example servers include web servers, application servers, virtual or physical servers, or any combination or variation thereof, of which computing apparatus 591 in FIG. 5 is broadly representative.

To access the database 104, the service platform 101 requires the client device 102 to perform one or more verification processes to identify and/or authenticate a user of the client device 102. One such verification process involves a zero-knowledge proof (ZKP) method, in which the client device 102 demonstrates the user's identity without revealing sensitive credentials. For example, as illustrated, a user of the client device 102 may be prompted via a user interface 106 on a display 108 to provide private or confidential information 110, such as personally identifiable information (PII). While the user of the client device 102 provides this information to the service platform 101 to authenticate himself or herself, the user may not want to reveal the confidential information 110 to the service platform 101. As such, a ZKP technique is leveraged to ensure that the user can securely access the database 104 while maintaining the privacy of their confidential information 110. It should be appreciated that while the following illustrative example involves leveraging the ZKP process for accessing the database 104, it should be appreciated that verification processes described herein can be leveraged for a variety of interactions between an endpoint (e.g., client device) and a distributed system, such as the service platform 101.

To provide an enhanced verification process, in particular a verification process involving an improved ZKP with enhanced security, the privacy engine 112 is leveraged by the service platform 101. As noted above, a ZKP process involves a prover and a verifier, where the prover demonstrates to the verifier that they possess certain knowledge or satisfy a specific condition, such as possession of the confidential information 110, without revealing the underlying information itself. As such, the privacy engine 112 may operate through two instances: one on the prover-side, such as at the client device 102, to initiate the ZKP process, and one on the verifier-side, such as at the service platform 101, to validate the proof. This arrangement of the privacy engine 112 is described in greater detail below with respect to FIGS. 2-4.

To initiate the verification process, the client device 102 generates a commitment based on the user's confidential information 110, such as a password or PII, that verifies the user's identity. As will be described in greater detail below, the commitment does not disclose the actual confidential information 110, ensuring that sensitive information remains private. The commitment is then transmitted to the service platform 101 for validation. Responsive to receiving the commitment, the service platform 101 evaluates the commitment to confirm that the user possesses the confidential information 110. As will be described in greater detail below, validating the client device 102 involves an interactive process between the client device 102 and the service platform 101 that allows the service platform 101 to verify the user's confidential information 110 without ever accessing or storing the confidential information 110. Once the verification process is successfully validated, the service platform 101 authorizes the client device 102 to access specific resources and services, including the database 104, which initiated the verification process.

With the verification process complete, the client device 102 is granted access to the database 104 under the control of the service platform 101. The platform ensures that all actions, such as retrieving, modifying, or storing files, are performed according to the permissions associated with the user's verified confidential information 110. If additional authorization is required, the client device 102 can generate supplementary verification processes to demonstrate specific rights to access particular files, services, or data entries. By leveraging the privacy engine 112, the service platform 101 ensures that every interaction with the database 104 is authenticated and compliant with the system's security policies while protecting user privacy and confidential information 110. The privacy engine 112 eliminates the need to share or store sensitive credentials, such as the confidential information 110, thereby significantly reducing the risk of data breaches or unauthorized access within the environment 100.

Figure 2:
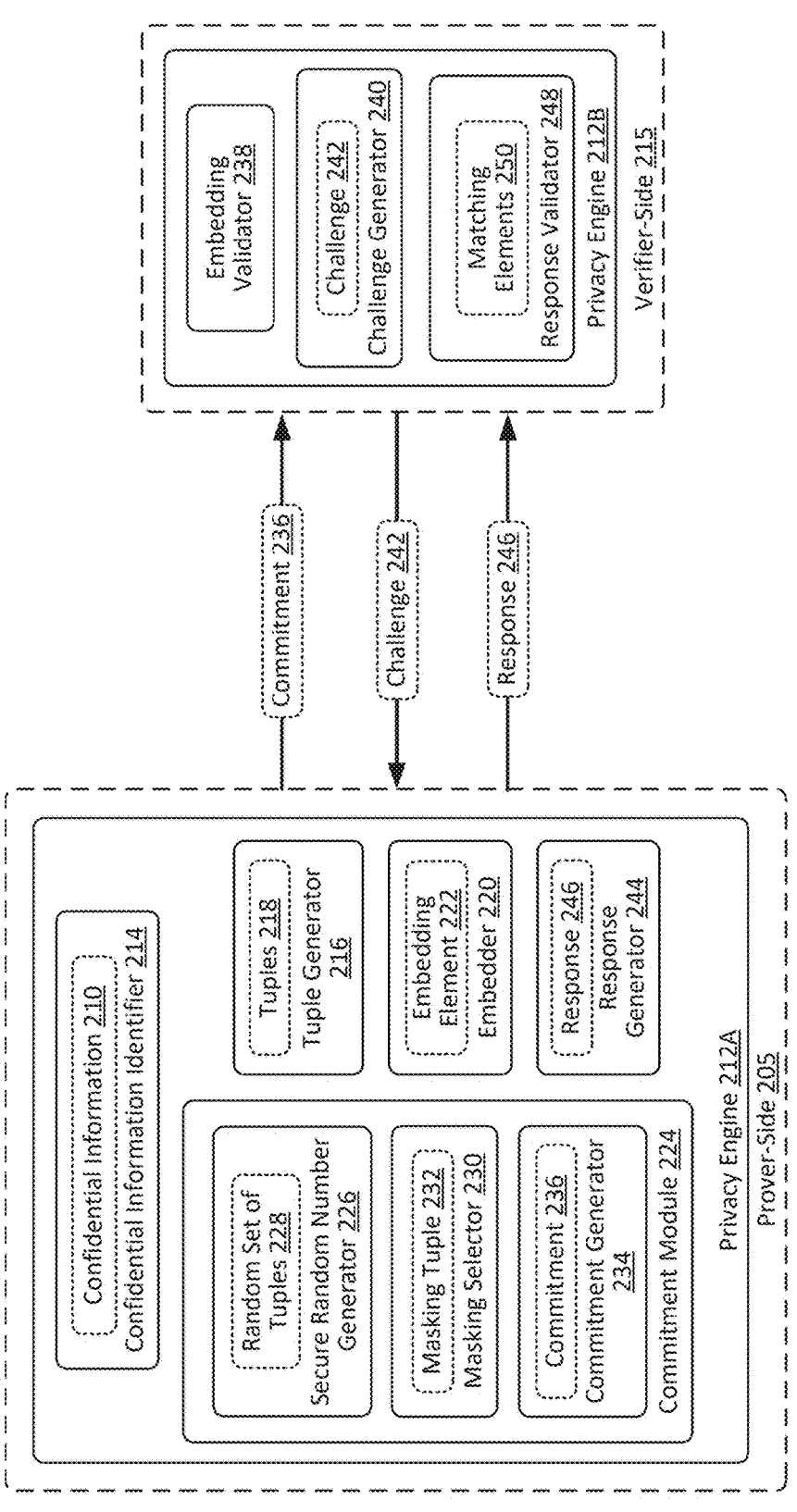
FIG. 2 illustrates an example operational environment in which a privacy engine is implemented to validate a prover-side's possession of confidential information during a verification process, according to an embodiment herein.

Referring now to FIG. 2, an example operational environment 200 in which a privacy engine 212A-B is implemented to validate a prover-side's possession of confidential information 210 during a verification process is provided, according to an embodiment herein. For ease of explanation, FIG. 2 is described in conjunction with FIG. 3, which provides an example privacy engine process, in particular a process 300 for providing the privacy engine 212A-B and one or more of its functions, according to an embodiment herein. While FIG. 3 is described with relation to FIG. 2, it should be appreciated that components, elements, and steps from any other Figures described herein may be equally applicable.

As illustrated, the operational environment 200 includes a prover-side 205 and a verifier-side 215. The prover-side 205 is associated with the endpoint or computing device providing the confidential information 210 during one or more verification processes. For example, the prover-side 205 may be associated with the client device 202 authenticating the identity of its user with the service platform 101 to gain access to the database 104. Conversely, the verifier-side 215 is associated with a computing device or system that requires the verification process to be performed so that the prover-side 205 can perform one or more actions, such as accessing a particular service or functionality. Following the above example, the verifier-side 215 may be associated with the service platform 101.

As noted above, the privacy engine 212A-B, which may be the same or similar to the privacy engine 112, may operate as two separate instances to perform the verification process. That is, the privacy engine 212A may be executed locally on the prover-side 205, such as on the client device 102, or it may be executed remotely on behalf of the prover-side 205, such as via an instance running on the service platform 101. In contrast, the privacy engine 212B is executed remotely on the service platform 101. In the cases where the verifier-side 215 is associated with another endpoint, such as a second client device, the privacy engine 212B may execute locally on that endpoint or be remotely executed on behalf of the verifier-side 215 via an instance running on the service platform 101.

To initiate the verification process, the privacy engine 212A identifies the confidential information 210. That is, the privacy engine 212A may include a confidential information identifier 214 that identifies the confidential information 210 for the verification process. For example, if a user is prompted to input the confidential information 210, such as via the display 108 on the user interface 106 of the client device 102, the confidential information identifier 214 may identify the confidential information 210 as the inputs into the respective fields within the display 108.

Once the confidential information 210 is identified, the privacy engine 212A converts the confidential information 210 into tuples 218 for the verification process (352). In particular, the privacy engine 212A includes a tuple generator 216 that converts the confidential information 210 into the tuples 218. As those skilled in the art readily appreciate, a tuple in programming is an immutable, ordered collection of elements, which can hold multiple data types and is often used to group related data. For example, if the confidential information 210 is a Social Security Number (SSN), the tuple generator 216 may convert the SSN into a tuple in different ways, depending on the intended structure. Under one approach, the tuple generator 216 converts each digit of an SSN into an element within a single tuple 218, resulting in a sequence where each digit is represented as an individual element. For example, converting an SSN of "123-45-6789" would produce the tuple 218: (1, 2, 3, 4, 5, 6, 7, 8, 9). In an alternative approach, the tuple generator 216 converts each digit of the SSN into its own tuple, resulting in a collection of nine tuples: (1,), (2,), (3,), (4,), (5,), (6,), (7,), (8,), (9,). These two approaches illustrate different ways of converting the confidential information 210 into the tuples 218: one as a single cohesive structure with multiple elements and the other as a set of individual tuples, depending on the application's requirements. As can be appreciated, the manner in which the confidential information 210 is converted into the tuples 218 may vary depending on the application and the content of the confidential information 210.

Once the tuples 218 are generated, the privacy engine 212A may embed an embedding element 222 into the tuples 218 (354). In particular, the privacy engine 212A includes an embedder 220 that embeds the embedding element 222, such as a digital watermark, into the tuples 218. That is, the embedder 220 includes an embedding function that embeds the embedding element 222 into the tuples 218. In some embodiments, the embedding element 222 is embedded into each of the tuples 218 as a new element. For example, the embedding element 222 may be embedded as an initial element within a respective tuple 218, such as: (Embedding Element (EE), 1, 2, 3, 4, 5, 6, 7, 8, 9) or (EE, 1), (EE, 2) . . . and (EE, 9). Alternatively, the embedding element 222 can be strategically placed between existing elements or encoded within the elements themselves, such as: (1, 2, 3, 4, 5, EE, 6, 7, 8, 9). By embedding the embedding element 222 into the tuples 218, the prover-side privacy engine 212A ensures that the embedding element 222 becomes an inseparable part of the tuple 218, enabling its identification or validation in downstream steps, as will be described in greater detail below.

Using the tuples 218, the privacy engine 212A generates a commitment 236 (356). In particular, the privacy engine 212A includes a commitment module 224 containing a commitment generator 234. In some embodiments, to generate the commitment 236, a secure random number generator 226 within the commitment module 224 generates a random set of tuples 228 from the tuples 218. That is, the privacy engine 212A generates a random set of tuples 228 from the tuples 218 to include in the commitment 236 (358).

To generate the random set of tuples 228, the tuples 218 are submitted to the secure random number generator (SRNG) 226. The SRNG 226 leverages advanced algorithms to produce the random set of tuples 228 that are both unpredictable and resistant to reverse-engineering, ensuring robust security. In an example embodiment, the SRNG 226 includes or operates as a cryptographically secure pseudo-random number generator (CSPRNG), such as the HMAC_DRBG (HMAC-based Deterministic Random Bit Generator). The SRNG 226 processes the tuples 218 through a hash-based function, resulting in the random set of tuples 228 while maintaining the statistical properties of the initial tuples 218. This ensures that the generated random set of tuples 228 retains a strong relationship to the original input (tuples 218) while achieving a high degree of randomness.

In some embodiments, the SRNG 226 generates the random set of tuples 228 using a seed, which is a random value that serves as the initial input for the generation process. The seed is critical to ensuring the unpredictability and security of the random set of tuples 228. The seed is derived from a high-entropy source, such as system-level noise, hardware-based random number generators, or a combination of unpredictable events like precise timing measurements, keystrokes, or network activity. Once obtained, this seed is processed by the SRNG 226 to produce a sequence of random values, such as the random set of tuples 228, derived from the initial tuples 218. In embodiments where the SRNG 226 implements a CSPRNG, the seeding process may include additional steps such as hashing or mixing functions to enhance the randomness of the seed and safeguard against potential attacks. This ensures that the random set of tuples 228 retains the essential characteristics of the original tuples 218 while meeting the stringent security and randomness requirements of the application.

Following the above example in which the tuples 218 include nine tuples 218 of (EE, 1), (EE, 2), (EE, 3), (EE, 4), (EE, 5), (EE, 6), (EE, 7), (EE, 8), (EE, 9), an example random set of tuples 228 generated by the SPRNG 226 based on a random value of 42A93F being the seed is:

{(EE,4), (EE,1), (EE,7), (EE,5), (EE,3), (EE,9), (EE,6), (EE,8), (EE,2)}

As noted above, the tuples 218 may be embedded with the embedding element 222, such as a digital watermark, prior to generation of the random set of tuples 228. As such, the random set of tuples 228 may include the embedding element 222. In other embodiments, however, the embedding element 222 may not be embedded into the tuples 218 until after they are used to generate the random set of tuples 228. That is, instead of the embedder 220 embedding the embedding element 222 into the tuples 218, the embedder 220 embeds the embedding element 222 into the random set of tuples 228 once generated.

In some embodiments, the commitment module 224 includes a masking selector 230 that selects a masking tuple 232 from the random set of tuples 228 (360). That is, the masking selector 230 selects one or more masking tuples 232 from the random set of tuples 228 at random to increase the randomness and security of the validation process. Following the above example random set of tuples 228, the masking selection 230 may select (EE,3) randomly for including in the commitment 236. By including the masking tuple 232 in the commitment 236, the underlying confidential information 210 remains secure and private.

Once the random set of tuples 228 is generated, and in some cases, the masking tuple 232 selected, the commitment generator 234 generates the commitment 236. In some embodiments, the commitment generator 234 may be or include a hashing function, such as HA-256 or HMAC-SHA256, that generates a hash value based on the random set of tuples 228 and the masking tuple 232, both of which include the embedding element 222. The commitment generator 234 may use a seed, which may be the same or similar to the seed used to generate the random set of tuples 228, to generate the commitment 236. In some embodiments, the SRNG 226 generates the seed that the commitment generator 234 uses to generate the commitment 236.

Following the above example, an example commitment 236 generated based on the random set of tuples 228 {(EE,4), (EE,1), (EE,7), (EE,5), (EE,3), (EE,9), (EE,6), (EE,8), (EE,2)} including the masking tuple 232 (EE, 3) and a seed of 42A93F may be as follows:

0edc78867bdc0b889d3f27216fa4913ed19f17005be
529b8a593cc42519c359d25c8
983bbef0a096719d6f4ace00c3330abded80e45e0
78b1be9c7e94d1a1a9a5ef92cb3b
b67f4938d3a6996c1047768064ba04c031f55030
13a3d5af67e7fc23a7a909099c9d
5989ca9dec57dfa10a8312d6c4760690d7bd3ec4
a95e18f1d4185eb41e212a1610e8
486e61d3d9d395c7ee4bf11c3322527e0d8b7caa
b3dea95ade7f6b0bcb65ac9faf5b0
43d81e4ea32a3f46edf382b40afe37f2e94a87c2f5
face72bc93598702e0e945f022e7
218a3ca655e198fde2558cd656768081433b7845
50ce52f25b467b80837b94e3af0c
6f70240eeabd011f05bbbaa6571c62feed0c3836c
7e26723f2332052cfb27dcf84b34
c359e432d56e037c559b0891933

Once generated, the commitment 236 is transmitted by the prover-side 205 to the verifier-side 215, where the privacy engine 212B receives the commitment 236. Responsive to receiving the commitment 236, the privacy engine 212B validates the commitment 236 (362). In particular, the privacy engine 212B includes an embedding validator 238 that validates that the commitment 236 includes the embedding element 222. To validate that the commitment 236 includes the embedding element 222, the embedding validator 238 decodes or decrypts the commitment 236 to extract the embedding element 222. In particular, the privacy engine 212B decodes the commitment 236 using a shared key or secret, such as the seed, used to generate the commitment 236. That is, to decode the embedding element 222 within the commitment 236, the privacy engine 212B reverses the cryptographic transformations applied to the random set of tuples 228 and, if included, the masking tuple 232 using the seed or shared key/secret used to generate the commitment 236. However, because the confidential information 210 is randomized in the random set of tuples 228 and excess data is included via the masking tuple 232, the confidentiality of the confidential information 210 is maintained.

To allow the privacy engine 212B on the verifier-side 215 to decode or decrypt the commitment 236, the privacy engine 212A and the privacy engine 212B may share the seed, a specific decoding function, or knowledge about how the commitment 236 is generated. For example, the privacy engines 212A-B may agree upon or leverage the same cryptographic system, such as a public-private key pair, to enable the verification process. In such scenarios, the privacy engine 212A possesses the private key, or seed, which is used to generate the commitment 236. When the commitment 236 is shared with the verifier-side 215, the privacy engine 212B uses the corresponding public key to decode the commitment 236. In another scenario, the privacy engine 212A may encode the commitment 236 with an encrypted version of the seed. The privacy engine 212B may have a respective decryption function to decrypt the seed from the commitment 236 and in turn decode the commitment 236 using the decrypted seed.

If the embedding validator 238 determines that the commitment 236 does not include the embedding element 222, the privacy engine 212B rejects the commitment 236 and may terminate the verification process. In contrast, if the privacy engine 212B detects the presence of the embedding element 222 within the commitment 236, the privacy engine 212B generates a challenge 242 to the commitment 236 (364). The challenge 242 is randomly generated by a challenge generator 240 of the privacy engine 212B. The challenge generator 240 generates the challenge 242 based on the content of the commitment 236, such as sampling portions of the random set of tuples 228 and/or the masking tuple 232 to generate the challenge 242. Once generated, the privacy engine 212B transmits the challenge 242 to the prover-side 205.

Responsive to generating the challenge 242, the privacy engine 212A-B validates that the prover-side privacy engine 212A possesses the confidential information using the commitment 236 (366). To validate that the prover-side 205 possesses the confidential information 210, a response generator 244 of the privacy engine 212A generates a response 246 to the challenge 242 responsive to receiving it. In some embodiments, the response 246 is generated based on the challenge 242. For example, the response generator 244 may determine a binary value, such as 0 or 1, based on the challenge 242 (368), and then based on the respective binary value, generate a respective response 246 (370).

In an example embodiment, if the challenge 242 corresponds to 0, such as being a challenge that is true, then the response generator 244 generates the response 246 to include the random set of tuples 228 and the masking tuple 232, both of which include the embedding element 222, as described above. If the challenge 242 corresponds to a 1, such as being a challenge that is false, then the response generator 244 generates the response 246 to include a tuple referenced in the challenge 242 or random tuple from the random set of tuples 228 and the masking tuple 232. Finally, if the challenge 242 corresponds to a combination of 0 and 1, such as being a challenge that contains both true and false content, then the response generator 244 generates the response 246 to include a combination of the entire random set of tuples 228, a subset of the randoms et of tuples 228, and the masking tuple 232. Once generated, the response 246 may be hashed using the same hashing function or procedure used to generate the commitment 236 and transmitted to the verifier-side 215.

Once the response 246 is received, the privacy engine 212B validates that the response 246 includes the embedding element 222, such as described above. If the response 246 does not include the embedding element 222, the privacy engine 212B may reject the response 246 and terminate the verification process. In contrast, if the embedding validator 238 validates the presence of the embedding element 222 within the response 246, the privacy engine 212B may continue onto validating the response 246.

To validate the response 246, the privacy engine 212B includes a response validator 248. The response validator 248 may generate matching elements 250 based on the response 246. That is, once the response 246 is decoded/decrypted using the shared secret, key, or seed, the privacy engine 212B uses the information in the response 246 to generate the matching elements 250 using the same hashing function or mechanism as used to generate the commitment 236. Since the response includes at least a portion of the random set of tuples 228, and the masking tuple 232, the matching elements 250, if the response 246 is valid, should match a portion of the commitment 236. As such, once the matching elements 250 are generated based on the content of the response 246, the privacy engine 212B can validate that the commitment 236 contains the matching elements 250 (374).

Once the privacy engine 212B validates that the commitment 236 contains the matching elements 250, the prover-side is validated as possessing the confidential information 210. As such, the verification process is completed and the prover-side 205 may be authenticated and may proceed to perform one or more actions that were previously restricted by the verification process.

Figure 4:
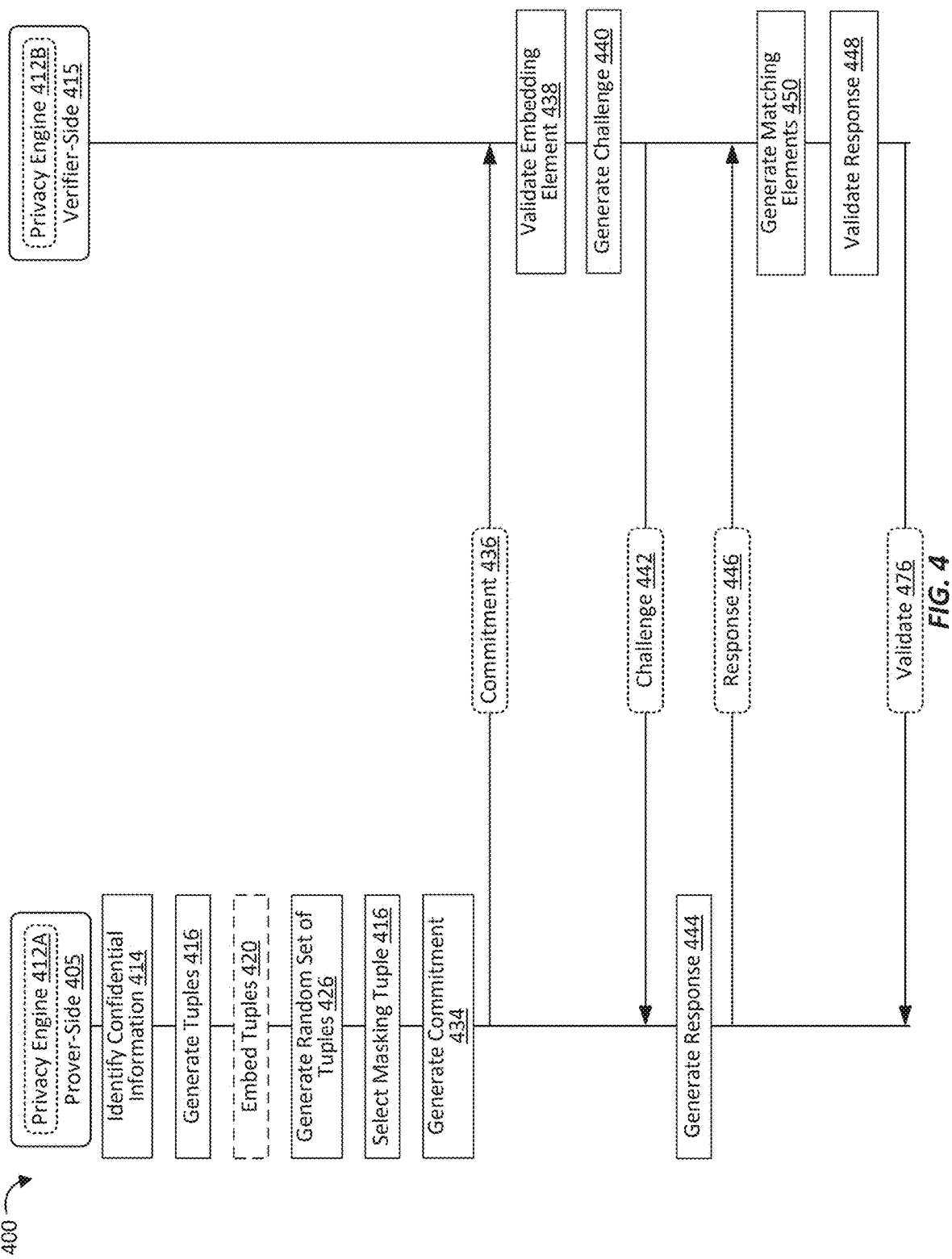
FIG. 4 illustrates an example operational flow for using a privacy engine within a distributed system, according to an embodiment herein.

Referring now to FIG. 4, an example operational flow 400 for using a privacy engine 412A-B within a distributed system is illustrated, according to an embodiment herein. As shown, a prover-side 405, which may be the same or similar to the prover-side 205, is in operational communication with a verifier-side 415, which may be the same or similar to the verifier-side 215. The prover-side 405 may include or otherwise be in operational communication with a privacy engine 412A, which may be the same or similar to the privacy engine 212A. Similarly, the verifier-side 415 may include or otherwise be in operational communication with a privacy engine 412B.

The operational flow 400 may be part of a verification process in which the prover-side 405 validates that it possesses various credentials or private information, such as the confidential information 210. As such, at the initiation of the verification process, the privacy engine 412A identifies the confidential information (414). Once identified, the privacy engine 412A converts the confidential information into tuples (416). As described above, depending on the content of the confidential information and the specific application, the privacy engine 412A may generate any number of tuples.

Once the tuples are generated, the privacy engine 412A embeds an embedding element, such as a watermark, into the tuples (420). The embedding element may be an identifier or timestamp that authenticates that the privacy engine 412A generated the subsequent commitment, thereby supporting the authentication of a corresponding user or endpoint. Once the tuples are embedded with the embedding element, the privacy engine 412A generates a random set of tuples (426). As described above, this may include generating a random value as a seed, such as using a secure random number generator (e.g., CSPRNG), and then submitting the tuples, along with the seed, into a CSPRNG. From the random set of tuples, the privacy engine 412A selects a masking tuple (416) for inclusion in the commitment. As noted above, in some embodiments, the embedding element is added to the random set of tuples instead of into the tuples prior to the randomization process.

Using the random set of tuples and the masking tuples, both of which include the embedding elements, the privacy engine 212A generates a commitment (434). Generation of the commitment may be performed using one or more hashing functions or algorithms. A selected hashing function for generation of the commitment may be agreed upon by the privacy engine 412A and the privacy engine 412B such the commitment can be validated by the privacy engine 412B in the following steps. Once generated, the commitment is transmitted to the verifier-side 415 (436).

Responsive to receiving the commitment, the privacy engine 412B validates the presence of the embedding element within the commitment (438). As described above, this may include decoding/decrypting the commitment to extract the embedding element using a secret, key, or seed shared between the privacy engines 412A-B. If the commitment does not contain the embedding element, the privacy engine 412B rejects the commitment and may terminate the verification process (e.g., flow 400). In contrast, if the commitment contains the embedding element, the privacy engine 412B generates a challenge based on the commitment (440).

The privacy engine 412B randomly generates the challenge based on the commitment. For example, the privacy engine 412B may generate a challenge that is either true or false based on the commitment. Once generated, the challenge is transmitted to the prover-side 405 (442). Responsive to receiving the challenge, the privacy engine 412A generates a response (444). As described above, the response is generated based on the challenge. For example, if the challenge is true, the privacy engine 412A generates the response to include certain portions of the random set of tuples, while if the challenge is false, the privacy engine 412A generates the response to include other portions of the random set of tuples. By randomizing the challenge, and generating the response based on the specific outcome of the challenge, the privacy engines 412A-B provide enhanced randomness and security over conventional ZKP techniques, requiring a specific sequence of exchanges between the prover-side 405 and the verifier-side 415 that is difficult to mimic or fake.

Once generated, the response is transmitted to the verifier-side 415 (446) where the privacy engine 412B validates the response. As an initial step to validating the response, the privacy engine 412B verifies that the response contains the embedded element(s). Then, once the presence of the embedding element within the response is verified, the privacy engine 412B generates matching elements 450 using a shared hashing function or mechanism used to generate the commitment. Then the privacy engine 412B compares the matching elements to the commitment to determine whether or not the commitment contains the matching elements. If the commitment contains the matching elements, then the privacy engine 412B validates the response (448). Validation of the response indicates that the prover-side 405 possesses the confidential information and the verification process is completed. In some embodiments, the privacy engine 412B generates a notification of the validation and sends it to the prover-side 405 (476). This may include acceptance of the requested action that initiated the verification process or granting access to particular service, functionality, or document that initiated the verification process.

Referring now to FIG. 5, is a diagram of a system 500 configured to implement a privacy engine, according to an embodiment herein. The system 500 may be an example of an apparatus including a computing apparatus 591 that is representative of any system or collection of systems in which the various processes, systems, programs, services, and scenarios disclosed herein may be implemented. For example, computing apparatus 591 may be an example privacy engine, such as the privacy engine 112, 212A-B, or 412A-B, a client device, such as the client device 102, or any of the subcomponents depicted in the operational environment 100, the operational environment 200, or the method or flows 300 and 400, respectively. Examples of computing apparatus 591 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 591 may be implemented as a single apparatus, system, or device or may be implemented in a distributed manner as multiple apparatuses, systems, or devices. Computing apparatus 591 may include, but is not limited to, processing system 596, storage system 593, software 595, communication interface system 597, and user interface system 599. Processing system 596 may be operatively coupled with storage system 593, communication interface system 597, and user interface system 599.

Processing system 596 may load and execute software 595 from storage system 593. Software 595 may include a privacy engine 592, which may be representative of any of the operations for providing a privacy engine or any of its related functions, as discussed with respect to the preceding figures. When executed by processing system 596, software 595 may direct processing system 596 to operate as described herein for at least the various processes, such as the process 300 or the flow 400, operational scenarios, and sequences discussed in the foregoing implementations. Computing apparatus 591 may optionally include additional devices, features, or functionality not discussed for purposes of brevity.

In some embodiments, processing system 596 may comprise a micro-processor and other circuitry that retrieves and executes software 595 from storage system 593. Processing system 596 may be implemented within a single processing device but may also be distributed across multiple processing devices or sub-systems that cooperate in executing program instructions. Examples of processing system 596 may include general purpose central processing units, graphical processing units, application specific processors, and logic devices, as well as any other type of processing device, combinations, or variations thereof.

Storage system 593 may comprise any memory device or computer-readable storage medium readable by processing system 596 and capable of storing software 595. Storage system 593 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 593 may also include computer readable communication media over which at least some of software 595 may be communicated internally or externally. Storage system 593 may be implemented as a single storage device but may also be implemented across multiple storage devices or sub-systems co-located or distributed relative to each other. Storage system 593 may comprise additional elements, such as a controller, capable of communicating with processing system 596 or possibly other systems.

Software 595 (including the privacy engine 592 among other functions) may be implemented in program instructions that may, when executed by processing system 596, direct processing system 596 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 595 may include additional processes, programs, or components, such as operating system software, virtualization software, or other application software. Software 595 may also comprise firmware or some other form of machine-readable processing instructions executable by processing system 596.

In general, software 595 may, when loaded into processing system 596 and executed, transform a suitable apparatus, system, or device (of which computing apparatus 591 is representative) overall from a general-purpose computing system into a special-purpose computing system as described herein. Indeed, encoding software 595 on storage system 593 may transform the physical structure of storage system 593. The specific transformation of the physical structure may depend on various factors in different implementations of this description. Examples of such factors may include, but are not limited to, the technology used to implement the storage media of storage system 593 and whether the computer-storage media are characterized as primary or secondary storage, as well as other factors.

For example, if the computer-readable storage medium is implemented as semiconductor-based memory, software 595 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 597 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 591 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as programmable logic controllers (PLCs), programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a privacy engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; processor-executable instructions stored on the computer-readable storage medium; and one or more processors coupled to the computer-readable storage medium and configured to execute the processor-executable instructions to operate a prover-side privacy engine within a distributed system, such that the processor-executable instructions, when executed by the one or more processors, direct the computing apparatus, to at least: identify confidential information for a verification process; convert the confidential information into a plurality of tuples; generate a random set of tuples from the plurality of tuples; embed an embedding element into the random set of tuples; generate a commitment based on the random set of tuples; and transmit the commitment to a verifier-side privacy engine to initiate a zero-knowledge proof protocol, wherein based on the zero-knowledge proof protocol, the verifier-side privacy engine validates that the prover-side privacy engine possesses the confidential information.

Example 2 is the computing apparatus of any previous or subsequent Example, wherein the processor-executable instructions to generate the random set of tuples from the plurality of tuples, when executed by the one or more processors, further direct the computing apparatus to: select a random value as a seed for a cryptographically Secure Pseudorandom Number Generator (CSPRNG); and submit the plurality of tuples and the seed to the CSPRNG, wherein the CSPRNG responsively generates the random set of tuples.

Example 3 is the computing apparatus of any previous or subsequent Example, wherein the processor-executable instructions to generate the commitment based on the random set of tuples, when executed by the one or more processors, further direct the computing apparatus to: select, by the prover-side privacy engine, a masking tuple from the random set of tuples; and generate, by the prover-side privacy engine, the commitment based on the masking tuple, and the masking tuple.

Example 4 is the computing apparatus of any previous or subsequent Example, wherein the processor-executable instructions, when executed by the one or more processors, further direct the computing apparatus to: select a masking tuple from the random set of tuples; receive, from the verifier-side privacy engine, a challenge to the commitment; determine a binary value of the challenge; and generate a response to the challenge based on the binary value, wherein the response comprises at least a portion of the random set of tuples, the masking tuple, and the embedded element.

Example 5 is the computing apparatus of any previous or subsequent Example, wherein the processor-executable instructions to embed the embedding element into the random set of tuples, when executed by the one or more processors, further direct the computing apparatus to: embed the embedding element into the plurality of tuples; and generate the random set of tuples from the plurality of tuples comprising the embedding element.

Example 6 is the computing apparatus of any previous or subsequent Example, wherein: the random set of tuples are generated using a random value as a seed; and the processor-executable instructions to generate, by the privacy engine, the commitment based on the random set of tuples, when executed by the one or more processors, further direct the computing apparatus to: generate a cryptographic hash of the random set of tuples and the seed as the commitment.

Example 7 is a method comprising: converting, by a prover-side privacy engine, confidential information into a plurality of tuples for a verification process; embedding, by the prover-side privacy engine, the plurality of tuples with an embedding element; generating, by the prover-side privacy engine, a commitment using the plurality of tuples; transmitting by the prover-side privacy engine, the commitment to a verifier-side privacy engine; responsive to receiving the commitment, verifying, by the verifier-side privacy engine, that the commitment comprises the embedded element; generating, by the verifier-side privacy engine, a challenge to the commitment based the commitment comprising the embedded element; transmitting, by the verifier-side privacy engine, the challenge to the prover-side privacy engine; responsive to receiving the challenge, generating, by the prover-side privacy engine, a response comprising the embedded element based on the challenge; and validating, by the verifier-side privacy engine, the response from the prover-side privacy engine based on the response comprising the embedded element.

Example 8 is the method of any previous or subsequent Example, wherein embedding, by the prover-side privacy engine, the plurality of tuples with the embedding element comprises: generating, by the prover-side privacy engine, a random set of tuples from the plurality of tuples; and embedding, by the prover-side privacy engine, the random set of tuples with the embedding element.

Example 9 is the method of any previous or subsequent Example, wherein: the method further comprises: generating, by the prover-side privacy engine, a random set of tuples from the plurality of tuples; and generating, by the prover-side privacy engine, the commitment using the plurality of tuples comprises generating, by the prover-side privacy engine, the commitment using the random set of tuples.

Example 10 is the method of any previous or subsequent Example, wherein generating the random set of tuples from the plurality of tuples comprises: determined, by the prover-side privacy engine, a random value as a seed for a Cryptographically Secure Pseudorandom Number Generator (CSPRNG); and generating, by the prover-side privacy engine, the random set of tuples from the plurality of tuples and the seed using the CSPRNG.

Example 11 is the method of any previous or subsequent Example, wherein verifying, by the verifier-side privacy engine, that the commitment comprises the embedded element comprises: identifying, by the verifier-side privacy engine, an embedding function associated with the commitment; decoding, by the verifier-side privacy engine, the commitment using the embedding function; and extracting, by the verifier-side privacy engine, the embedded element from the commitment as decoded via the embedding function.

Example 12 is the method of any previous or subsequent Example, wherein: generating, by the prover-side privacy engine, the commitment using the plurality of tuples comprises: generating, by the prover-side privacy engine, a random set of tuples from the plurality of tuples; and generating, by the prover-side privacy engine, the commitment using the random set of tuples; and generating, by the prover-side privacy engine, the response comprising the embedded element based on the challenge comprises: determining, by the prover-side privacy engine, one or more binary values based on the challenge; selecting, by the prover-side privacy engine, at least a subset of the random set of tuples for the response based on the one or more binary values; and generating, by the prover-side privacy engine, the response comprising the embedded element and the at least a subset of the random set of tuples.

Example 13 is the method of any previous or subsequent Example, wherein validating, by the verifier-side privacy engine, the response from the prover-side privacy engine based on the response comprising the embedded element comprises: validating, by the verifier-side privacy engine, that the response comprises the embedded element; and validating, by the verifier-side privacy engine, that the commitment comprises matching elements to the response.

Example 14 is a computer-readable storage medium comprising processor-executable instructions, wherein the processor-executable instructions, in part, operate a privacy engine to perform a Zero-Knowledge Proof (ZKP) protocol between a prover and a verifier within a distributed system such to cause one or more processors to: identify, by a prover-side privacy engine, confidential information for the ZKP protocol; convert, by the prover-side privacy engine, the confidential information into a plurality of tuples; generate, by the prover-side privacy engine, a random set of tuples from the plurality of tuples; embed, by the prover-side privacy engine, an embedding element into the random set of tuples; generate, by the prover-side privacy engine, a commitment based on the random set of tuples; transmit, by the prover-side privacy engine, the commitment to a verifier-side privacy engine; responsive to receiving the commitment, verify, by the verifier-side privacy engine, that the commitment comprises the embedded element; and validate, by the verifier-side privacy engine, that the prover-side privacy engine possesses the confidential information using the commitment.

Example 15 is the computer-readable storage medium of any previous or subsequent Example, wherein the processor-executable instructions to generate, by the prover-side privacy engine, the random set of tuples from the plurality of tuples cause the one or more processors to further execute processor-executable instructions stored in the computer-readable storage medium to: select, by the prover-side privacy engine, a random value as a seed for a cryptographically Secure Pseudorandom Number Generator (CSPRNG); and generate, by the prover-side privacy engine, the random set of tuples from the plurality of tuples and the seed using the CSPRNG.

Example 16 is the computer-readable storage medium of any previous or subsequent Example, wherein the processor-executable instructions to generate, by the prover-side privacy engine, the commitment based on the random set of tuples cause the one or more processors to further execute processor-executable instructions stored in the computer-readable storage medium to: select, by the prover-side privacy engine, a masking tuple from the random set of tuples; and generate, by the prover-side privacy engine, the commitment based on the masking tuple, and the random set of tuples.

Example 17 is the computer-readable storage medium of any previous or subsequent Example, wherein the processor-executable instructions to embed, by the prover-side privacy engine, the embedding element into the random set of tuples cause the one or more processors to further execute processor-executable instructions stored in the computer-readable storage medium to: embed, by the prover-side privacy engine, the embedding element into plurality of tuples; and generate, by the prover-side privacy engine, random set of tuples from the plurality of tuples comprising the embedded element.

Example 18 is the computer-readable storage medium of any previous or subsequent Example, wherein the processor-executable instructions to verify, by the verifier-side privacy engine, that the commitment comprises the embedded element cause the one or more processors to further execute processor-executable instructions stored in the computer-readable storage medium to: identify, by the verifier-side privacy engine, an embedding function associated with the commitment; decode, by the verifier-side privacy engine, the commitment using the embedding function; and extract, by the verifier-side privacy engine, the embedded element from the commitment as decoded via the embedding function.

Example 19 is the computer-readable storage medium of any previous or subsequent Example, wherein the processor-executable instructions to validate, by the verifier-side privacy engine, that the prover-side privacy engine possesses the confidential information using the commitment cause the one or more processors to further execute processor-executable instructions stored in the computer-readable storage medium to: generate, by the verifier-side privacy engine, a challenge to the commitment based the embedded element within the commitment; determine, by the prover-side privacy engine, one or more binary values based on the challenge; select, by the prover-side privacy engine, one or more tuples from the random set of tuples for a response based on the one or more binary values; and generate, by the prover-side privacy engine, the response comprising the embedded element and the one or more tuples.

Example 20 is the computer-readable storage medium of any previous or subsequent Example, wherein the processor-executable instructions to validate, by the verifier-side privacy engine, that the prover-side privacy engine possesses the confidential information using the commitment cause the one or more processors to further execute processor-executable instructions stored in the computer-readable storage medium to: generate, by the verifier-side privacy engine, a challenge to the commitment based the embedded element within the commitment; generate, by the prover-side privacy engine, a response comprising the embedded element and the one or more tuples from the random set of tuples; generate, by the verifier-side privacy engine, matching elements from the one or more tuples in the response; and validate, by the verifier-side privacy engine, that the commitment comprises the matching elements.

What is claimed is:

1. A computing apparatus comprising:
a computer-readable storage medium;
processor-executable instructions stored on the computer-readable storage medium; and
one or more processors coupled to the computer-readable storage medium and configured to execute the processor-executable instructions to operate a prover-side privacy engine within a distributed system, such that the processor-executable instructions, when executed by the one or more processors, direct the computing apparatus, to at least:
  identify confidential information for a verification process;
  convert the confidential information into a plurality of tuples;
  generate a random set of tuples from the plurality of tuples;
  embed an embedding element into the random set of tuples;
  generate a commitment based on the random set of tuples; and
  transmit the commitment to a verifier-side privacy engine to initiate a zero-knowledge proof protocol, wherein based on the zero-knowledge proof protocol, the verifier-side privacy engine validates that the prover-side privacy engine possesses the confidential information.

2. The computing apparatus of claim 1, wherein the processor-executable instructions to generate the random set of tuples from the plurality of tuples, when executed by the one or more processors, further direct the computing apparatus to:
  select a random value as a seed for a cryptographically Secure Pseudorandom Number Generator (CSPRNG); and
  submit the plurality of tuples and the seed to the CSPRNG, wherein the CSPRNG responsively generates the random set of tuples.

3. The computing apparatus of claim 1, wherein the processor-executable instructions to generate the commitment based on the random set of tuples, when executed by the one or more processors, further direct the computing apparatus to:
  select, by the prover-side privacy engine, a masking tuple from the random set of tuples; and
  generate, by the prover-side privacy engine, the commitment based on the masking tuple, and the random set of tuples.

4. The computing apparatus of claim 1, wherein the processor-executable instructions, when executed by the one or more processors, further direct the computing apparatus to:
  select a masking tuple from the random set of tuples;
  receive, from the verifier-side privacy engine, a challenge to the commitment;
  determine a binary value of the challenge; and
  generate a response to the challenge based on the binary value, wherein the response comprises at least a portion of the random set of tuples, the masking tuple, and the embedding element.

5. The computing apparatus of claim 1, wherein the processor-executable instructions to embed the embedding element into the random set of tuples, when executed by the one or more processors, further direct the computing apparatus to:
  generate the random set of tuples from the plurality of tuples comprising the embedding element.

6. The computing apparatus of claim 1, wherein:
  the random set of tuples are generated using a random value as a seed; and
  the processor-executable instructions to generate, by the prover-side privacy engine, the commitment based on the random set of tuples, when executed by the one or more processors, further direct the computing apparatus to:
    generate a cryptographic hash of the random set of tuples and the seed as the commitment.

7. A method comprising:
converting, by a prover-side privacy engine, confidential information into a plurality of tuples for a verification process;
embedding, by the prover-side privacy engine, the plurality of tuples with an embedding element;
generating, by the prover-side privacy engine, a commitment using the plurality of tuples;
transmitting by the prover-side privacy engine, the commitment to a verifier-side privacy engine to initiate a zero-knowledge proof protocol, wherein based on the zero-knowledge proof protocol, the verifier-side privacy engine validates that the prover-side privacy engine possesses the confidential information;
responsive to receiving the commitment, verifying, by the verifier-side privacy engine, that the commitment comprises the embedding element;
generating, by the verifier-side privacy engine, a challenge to the commitment based the commitment comprising the embedding element;
transmitting, by the verifier-side privacy engine, the challenge to the prover-side privacy engine;
responsive to receiving the challenge, generating, by the prover-side privacy engine, a response comprising the embedding element based on the challenge; and
validating, by the verifier-side privacy engine, the response from the prover-side privacy engine based on the response comprising the embedding element.

8. The method of claim 7, wherein embedding, by the prover-side privacy engine, the plurality of tuples with the embedding element comprises:

generating, by the prover-side privacy engine, a random set of tuples from the plurality of tuples; and embedding, by the prover-side privacy engine, the random set of tuples with the embedding element.

9. The method of claim 7, wherein:

the method further comprises:

generating, by the prover-side privacy engine, a random set of tuples from the plurality of tuples; and generating, by the prover-side privacy engine, the commitment using the plurality of tuples comprises generating, by the prover-side privacy engine, the commitment using the random set of tuples.

10. The method of claim 9, wherein generating the random set of tuples from the plurality of tuples comprises:

determined, by the prover-side privacy engine, a random value as a seed for a Cryptographically Secure Pseudorandom Number Generator (CSPRNG); and generating, by the prover-side privacy engine, the random set of tuples from the plurality of tuples and the seed using the CSPRNG.

11. The method of claim 7, wherein verifying, by the verifier-side privacy engine, that the commitment comprises the embedding element comprises:

identifying, by the verifier-side privacy engine, an embedding function associated with the commitment;

decoding, by the verifier-side privacy engine, the commitment using the embedding function; and extracting, by the verifier-side privacy engine, the embedding element from the commitment as decoded via the embedding function.

12. The method of claim 7, wherein:

generating, by the prover-side privacy engine, the commitment using the plurality of tuples comprises:

generating, by the prover-side privacy engine, a random set of tuples from the plurality of tuples; and generating, by the prover-side privacy engine, the commitment using the random set of tuples; and generating, by the prover-side privacy engine, the response comprising the embedding element based on the challenge comprises:

determining, by the prover-side privacy engine, one or more binary values based on the challenge;

selecting, by the prover-side privacy engine, at least a subset of the random set of tuples for the response based on the one or more binary values; and generating, by the prover-side privacy engine, the response comprising the embedding element and the at least a subset of the random set of tuples.

13. The method of claim 7, wherein validating, by the verifier-side privacy engine, the response from the prover-side privacy engine based on the response comprising the embedding element comprises:

validating, by the verifier-side privacy engine, that the response comprises the embedding element; and validating, by the verifier-side privacy engine, that the commitment comprises matching elements to the response.

14. A computer-readable storage medium comprising processor-executable instructions, wherein the processor-executable instructions, in part, operate a privacy engine to perform a Zero-Knowledge Proof (ZKP) protocol between a prover and a verifier within a distributed system such to cause one or more processors to:

identify, by a prover-side privacy engine, confidential information for the ZKP protocol;

convert, by the prover-side privacy engine, the confidential information into a plurality of tuples;

generate, by the prover-side privacy engine, a random set of tuples from the plurality of tuples;

embed, by the prover-side privacy engine, an embedding element into the random set of tuples;

generate, by the prover-side privacy engine, a commitment based on the random set of tuples;

transmit, by the prover-side privacy engine, the commitment to a verifier-side privacy engine;

responsive to receiving the commitment, verify, by the verifier-side privacy engine, that the commitment comprises the embedding element; and validate, by the verifier-side privacy engine, that the prover-side privacy engine possesses the confidential information using the commitment based on the ZKP protocol.

15. The computer-readable storage medium of claim 14, wherein the processor-executable instructions to generate, by the prover-side privacy engine, the random set of tuples from the plurality of tuples cause the one or more processors to further execute processor-executable instructions stored in the computer-readable storage medium to:

select, by the prover-side privacy engine, a random value as a seed for a cryptographically Secure Pseudorandom Number Generator (CSPRNG); and generate, by the prover-side privacy engine, the random set of tuples from the plurality of tuples and the seed using the CSPRNG.

16. The computer-readable storage medium of claim 14, wherein the processor-executable instructions to generate, by the prover-side privacy engine, the commitment based on the random set of tuples cause the one or more processors to further execute processor-executable instructions stored in the computer-readable storage medium to:

select, by the prover-side privacy engine, a masking tuple from the random set of tuples; and generate, by the prover-side privacy engine, the commitment based on the masking tuple, and the random set of tuples.

17. The computer-readable storage medium of claim 14, wherein the processor-executable instructions to embed, by the prover-side privacy engine, the embedding element into the random set of tuples cause the one or more processors to further execute processor-executable instructions stored in the computer-readable storage medium to:

embed, by the prover-side privacy engine, the embedding element into plurality of tuples; and generate, by the prover-side privacy engine, the random set of tuples from the plurality of tuples comprising the embedding element.

18. The computer-readable storage medium of claim 14, wherein the processor-executable instructions to verify, by the verifier-side privacy engine, that the commitment comprises the embedding element cause the one or more processors to further execute processor-executable instructions stored in the computer-readable storage medium to:

identify, by the verifier-side privacy engine, an embedding function associated with the commitment;

decode, by the verifier-side privacy engine, the commitment using the embedding function; and extract, by the verifier-side privacy engine, the embedding element from the commitment as decoded via the embedding function.

19. The computer-readable storage medium of claim 14, wherein the processor-executable instructions to validate, by the verifier-side privacy engine, that the prover-side privacy engine possesses the confidential information using the commitment cause the one or more processors to further execute processor-executable instructions stored in the computer-readable storage medium to:

generate, by the verifier-side privacy engine, a challenge to the commitment based the embedding element within the commitment;

determine, by the prover-side privacy engine, one or more binary values based on the challenge;

select, by the prover-side privacy engine, one or more tuples from the random set of tuples for a response based on the one or more binary values; and generate, by the prover-side privacy engine, the response comprising the embedding element and the one or more tuples.

20. The computer-readable storage medium of claim 14, wherein the processor-executable instructions to validate, by the verifier-side privacy engine, that the prover-side privacy engine possesses the confidential information using the commitment cause the one or more processors to further execute processor-executable instructions stored in the computer-readable storage medium to:

generate, by the verifier-side privacy engine, a challenge to the commitment based the embedding element within the commitment;

generate, by the prover-side privacy engine, a response comprising the embedding element and the one or more tuples from the random set of tuples;

generate, by the verifier-side privacy engine, matching elements from the one or more tuples in the response; and validate, by the verifier-side privacy engine, that the commitment comprises the matching elements.

* * * * *